(12) United States Patent
Qiang et al.

(10) Patent No.: US 12,744,623 B2
(45) Date of Patent: Sep. 22, 2026

(54) DATA TRANSMISSION METHOD AND COMMUNICATION APPARATUS

(71) Applicant: Huawei Technologies Co., Ltd., Shenzhen (CN)

(72) Inventors: Li Qiang, Beijing (CN); Nannan Liu, Beijing (CN); Junren Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 19/042,535

(22) Filed: Jan. 31, 2025

(65) Prior Publication Data

US 2025/0184041 A1 Jun. 5, 2025

Related U.S. Application Data

(63) Continuation of application No. PCT/CN2023/105231, filed on Jun. 30, 2023.

(30) Foreign Application Priority Data

Aug. 5, 2022 (CN) ........................ 202210948232.4

(51) Int. Cl.
*H04L 1/1607* (2023.01)
*H04L 1/1829* (2023.01)
*H04W 72/56* (2023.01)

(52) U.S. Cl.
CPC .......... *H04L 1/1607* (2013.01); *H04L 1/1854* (2013.01); *H04W 72/56* (2023.01)

(58) Field of Classification Search
None
See application file for complete search history.

(56) References Cited

U.S. PATENT DOCUMENTS 6,947,394 B1 * 9/2005 Johansson .............. H04L 1/188 370/282
8,331,399 B2 * 12/2012 Meylan .................. H04L 1/008 370/466

(Continued)

FOREIGN PATENT DOCUMENTS

CN 110140338 A 8/2019
JP 2003234688 A 8/2003

OTHER PUBLICATIONS

C. Khirallah, D. Vukobratović and J. Thompson, “Performance evaluation and energy efficiency of random network coding in LTE-Advanced,” 2012 IEEE International Conference on Communications (ICC), Ottawa, ON, Canada, 2012, pp. 4574-4578, (Year: 2012).*

*Primary Examiner* — Daniel F. McMahon
(74) *Attorney, Agent, or Firm* — Slater Matsil, LLP

(57) ABSTRACT

This application provides a data transmission method and a communication apparatus, and relates to the communication field. In the method, a transmitting end may sequentially deliver k consecutive PDU sets to m protocol entities in a first sequence, and sequentially send the k PDU sets. When k>m, k−m consecutive PDU sets starting from the $(m+1)^{th}$ PDU set in the k PDU sets are sequentially delivered to the m protocol entities in the first sequence, priorities of the m protocol entities are different from each other, and m>1.

20 Claims, 6 Drawing Sheets

(56) References Cited

U.S. PATENT DOCUMENTS

| | | | | |
|---|---|---|---|---|
| 10,432,761 | B2 * | 10/2019 | Yang | H04L 69/321 |
| 11,064,563 | B2 * | 7/2021 | Kim | H04W 76/15 |
| 2005/0047525 | A1 * | 3/2005 | Lee | H04L 1/1841<br>375/316 |
| 2009/0203374 | A1 * | 8/2009 | Chun | H04L 1/1628<br>455/425 |
| 2016/0381595 | A1 * | 12/2016 | Lee | H04W 72/21<br>370/329 |
| 2019/0306871 | A1 * | 10/2019 | Liu | H04W 28/06 |
| 2023/0283407 | A1 * | 9/2023 | Sheik | H04L 1/16 |

* cited by examiner

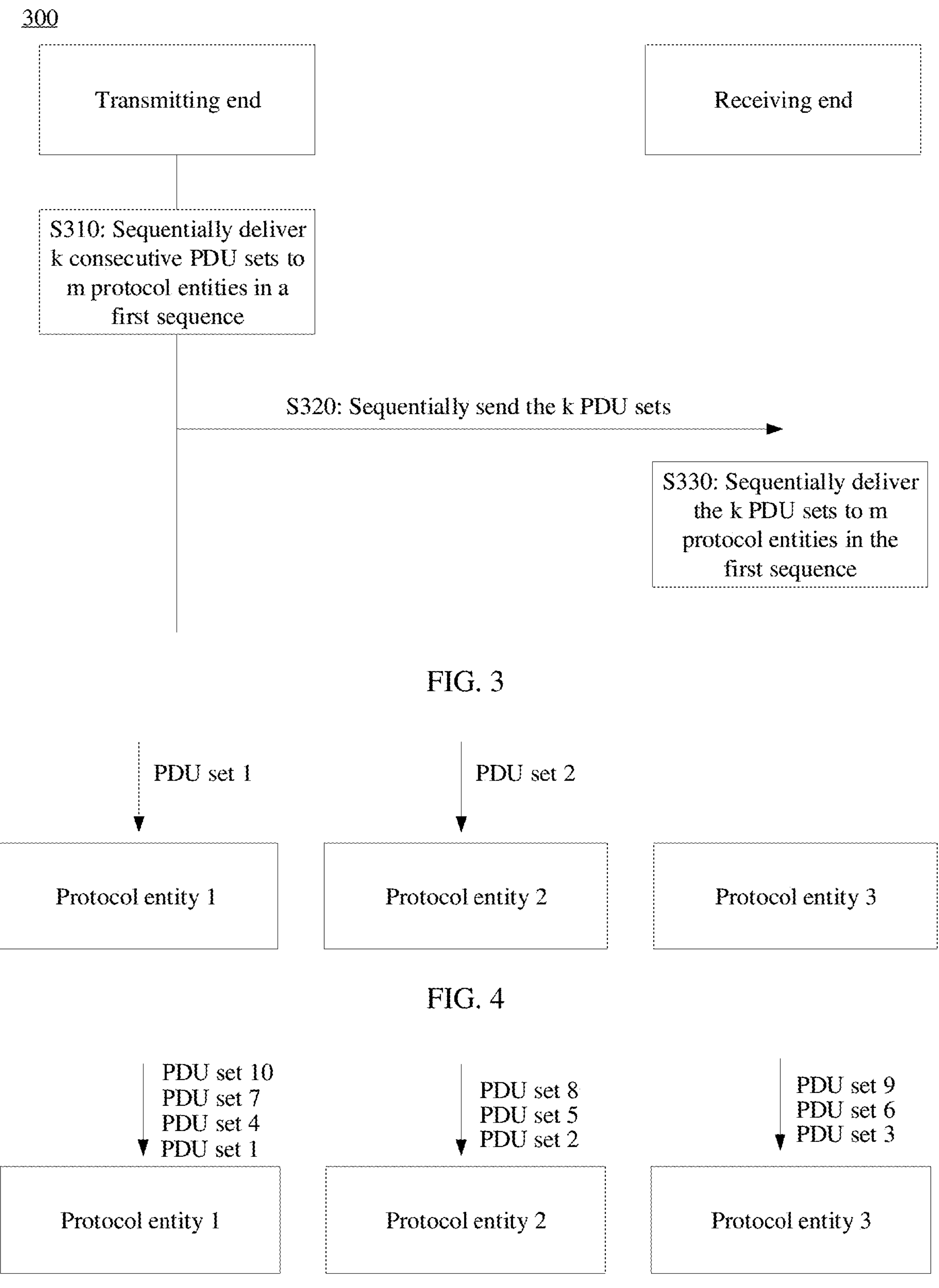
300
Transmitting end
Receiving end
S310: Sequentially deliver k consecutive PDU sets to m protocol entities in a first sequence
S320: Sequentially send the k PDU sets
S330: Sequentially deliver the k PDU sets to m protocol entities in the first sequence
FIG. 3
PDU set 1
PDU set 2
Protocol entity 1
Protocol entity 2
Protocol entity 3
FIG. 4
PDU set 10
PDU set 7
PDU set 4
PDU set 1
PDU set 8
PDU set 5
PDU set 2
PDU set 9
PDU set 6
PDU set 3
Protocol entity 1
Protocol entity 2
Protocol entity 3
FIG. 5

DATA TRANSMISSION METHOD AND COMMUNICATION APPARATUS

CROSS-REFERENCE TO RELATED APPLICATIONS

This application is a continuation of International Application No. PCT/CN2023/105231, filed on Jun. 30, 2023, which claims priority to Chinese Patent Application No. 202210948232.4, filed on Aug. 5, 2022. The disclosures of the aforementioned applications are hereby incorporated by reference in their entireties.

TECHNICAL FIELD

This application relates to the communication field, and in particular, to a data transmission method and a communication apparatus.

BACKGROUND

Extended reality (XR) includes many virtual reality technologies such as virtual reality (VR), augmented reality (AR), and mediated reality (MR). Each frame of picture in an XR video is actually split into dozens to hundreds of protocol data units (PDU) for transmission. The complete frame can be restored as long as a specific proportion (for example, 80%) of the PDUs are successfully received. In other words, if more than a specific proportion (for example, 20%) of the PDUs are lost, the complete frame cannot be restored even if all the remaining PDUs are correctly received. Therefore, to restore the complete frame, the receiving end needs to learn of a frame of picture to which a received PDU belongs. One solution is that a transmitting end may send a frame number to the receiving end, and the receiving end may learn of, based on the received frame number, a frame to which a received PDU belongs.

However, because a frame number needs to be carried when each PDU is sent, high resource overheads are caused.

SUMMARY

This application provides a data transmission method and a communication apparatus, to reduce resource overheads while ensuring that a receiving end can learn of a PDU set to which a PDU belongs.

According to a first aspect, a data transmission method is provided. The method includes: sequentially delivering k consecutive PDU sets to m protocol entities in a first sequence; and sequentially sending the k PDU sets. When k>m, k−m consecutive PDU sets starting from the $(m+1)^{th}$ PDU set in the k PDU sets are sequentially delivered to the m protocol entities in the first sequence, priorities of the m protocol entities are different from each other, k≥1, and m>1.

In an implementation, the first sequence is a polling sequence of the $1^{st}$ to the $m^{th}$ protocol entities in the m protocol entities, or the first sequence is an arrangement sequence of the m protocol entities, or the m protocol entities are arranged in the first sequence.

In an implementation, the sequentially delivering k consecutive PDU sets to m protocol entities in a first sequence includes: delivering the $q^{th}$ PDU set in the k PDU sets to the $v^{th}$ protocol entity in the m protocol entities. If q mod m≠0, v=q mod m, or if q mod m=0, v=m; and mod represents a modulo operation.

According to the data transmission method provided in this application, the PDU sets are delivered to the m protocol entities in a polling manner in a sequence of the PDU sets. Only one PDU set is delivered to one protocol entity at a same moment, a transmitting end sends the PDU sets in sequence, and a receiving end receives the PDU sets on protocol entities corresponding to the protocol entities of the transmitting end. Therefore, numbers of the PDU sets do not need to be transmitted through an air interface, and the receiving end can also learn of a PDU set to which each PDU that is to be sent, that is being sent, or that has been received belongs, so that air interface resources can be saved.

In some implementations of the first aspect, the sequentially sending the k PDU sets includes: sequentially sending the k PDU sets by using a transmission resource; and adjusting the priorities of the m protocol entities if a current transmission resource is exhausted or less than a first preset value.

After the priorities of the m protocol entities are adjusted, a PDU set that has not been sent continues to be sent.

In some implementations of the first aspect, the adjusting the priorities of the m protocol entities if a current transmission resource is exhausted or less than a first preset value includes: if the current transmission resource is insufficient to send the $s^{th}$ PDU set in the k PDU sets completely, adjusting a priority of a protocol entity corresponding to the $s^{th}$ PDU set to highest; or if the current transmission resource is used to send the $s^{th}$ PDU set completely but is insufficient to send the $(s+1)^{th}$ PDU set, adjusting a priority of a protocol entity corresponding to the $(s+1)^{th}$ PDU set to highest.

Based on this solution, after obtaining a transmission resource again, the receiving end may first send a remaining PDU in the $s^{th}$ PDU set that is being transmitted before, or send the $(s+1)^{th}$ PDU set, to ensure that the PDU sets are sent in sequence.

Optionally, in addition to adjusting the priority of the protocol entity corresponding to the $s^{th}$ PDU set to highest, priorities of other m−1 protocol entities in the m protocol entities may also be adjusted.

For example, when [j+(a−b)+m] mod m≠0, an adjusted priority of the $j^{th}$ protocol entity in the m protocol entities is an unadjusted priority of the $([j+(a-b)+m] \bmod m)^{th}$ protocol entity in the m protocol entities. When [j+(a−b)+m] mod m=0, an adjusted priority of the $j^{th}$ protocol entity in the m protocol entities is an unadjusted priority of the $m^{th}$ protocol entity in the m protocol entities. The $a^{th}$ protocol entity in the m protocol entities is used to carry the $s^{th}$ PDU set, and before the adjustment, the $b^{th}$ protocol entity in the m protocol entities is a protocol entity with a highest priority in the m protocol entities, where 1≤a≤m, and 1≤b≤m.

Optionally, in addition to adjusting the priority of the protocol entity corresponding to the $(s+1)^{th}$ PDU set to highest, priorities of other m−1 protocol entities in the m protocol entities may also be adjusted.

For example, when [j+(a−b)+m] mod m+0, an adjusted priority of the $j^{th}$ protocol entity in the m protocol entities is an unadjusted priority of the $([j+(a-b)+m] \bmod m)^{th}$ protocol entity in the m protocol entities. When [j+(a−b)+m] mod m=0, an adjusted priority of the $j^{th}$ protocol entity in the m protocol entities is an unadjusted priority of the $m^{th}$ protocol entity in the m protocol entities. The $a^{th}$ protocol entity in the m protocol entities is used to carry the $(s+1)^{th}$ PDU set, and before the adjustment, the $b^{th}$ protocol entity in the m protocol entities is a protocol entity with a highest priority in the m protocol entities, where 1≤a≤m, and 1≤b≤m.

In some implementations of the first aspect, the sequentially sending the k PDU sets includes: adjusting the priorities of the m protocol entities after each PDU set is sent completely. The unadjusted priorities of the m protocol entities are sequentially m1, m2, . . . , and mm, and adjusted priorities of the m protocol entities are sequentially mm, m1, . . . , and m (m−1), where m1 is the highest priority in m1 to mm, and mm is the lowest priority in m1 to mm.

In other words, when $2 \le j \le m$, the adjusted priority of the $j^{th}$ protocol entity in the m protocol entities is an unadjusted priority of the $(j-1)^{th}$ protocol entity in the m protocol entities. When j=1, an adjusted priority of the $1^{st}$ protocol entity in the m protocol entities is an unadjusted priority of the $m^{th}$ protocol entity in the m protocol entities.

Before the adjustment, a protocol entity corresponding to a PDU set that is being sent has a highest priority, and after the adjustment, a protocol entity corresponding to a PDU set that is to be sent has a highest priority. This can ensure that the PDU sets are sent in sequence.

In some implementations of the first aspect, the method further includes: if the $w^{th}$ PDU set in the k PDU sets is invalid, discarding a PDU that is not successfully transmitted in the $w^{th}$ PDU set, where $w \ge 1$.

In some implementations of the first aspect, the method may further include: discarding at least one PDU set. The at least one PDU set is the $(w+1)^{th}$ PDU set to the $(w+e)^{th}$ PDU set, $e \ge 1$, the at least one PDU set is of a first type and is associated with the $w^{th}$ PDU set, both the $w^{th}$ PDU set and the $(w+e+1)^{th}$ PDU set are of a second type, and the first type is different from the second type.

Based on this solution, some PDU sets associated with an invalid PDU set are discarded, so that transmission resources can be saved without affecting data recovery at the receiving end.

In some implementations of the first aspect, the first type is a P-frame, and the second type is not a P-frame. Alternatively, the first type is a P-slice, and the second type is not a P-slice. Alternatively, the first type is a PDU set that can be discarded, and the second type is a PDU set that cannot be discarded. Alternatively, the first type is an unimportant PDU set, and the second type is an important PDU set. Alternatively, the first type is a PDU set carrying video data, and the second type is a PDU set carrying voice data. Alternatively, the first type is a PDU set carrying non-control information, and the second type is a PDU set carrying control information. Alternatively, the first type is a PDU set with a lower priority, and the second type is a PDU set with a higher priority. Alternatively, the first type is a dependent PDU set, and the second type is a depended PDU set.

In some implementations of the first aspect, the protocol entity is any one of the following: a packet data convergence protocol (PDCP) entity, a radio link control (RLC) entity, a service data adaptation protocol (SDAP) entity, or a medium access control entity (MAC) entity.

In some implementations of the first aspect, max, and x is determined based on one or more of the following: a periodicity of the PDU set, validity duration of the PDU set, or maximum duration of the PDU set.

In some implementations of the first aspect, $x=\lceil (T/P)+1 \rceil$, $x=\lceil T/P \rceil+1$, or $x=\lceil (t+T)/P \rceil$, $\lceil\ \rceil$ indicates rounding up, P is the periodicity of the PDU set, T is the validity duration of the PDU set, and t is the maximum duration of the PDU set.

Based on this solution, a quantity of protocol entities is properly set, so that it can be ensured that there is a PDU of only one PDU set in any protocol entity at any moment, and PDUs in two PDU sets are not mixed. Because the m protocol entities used by the receiving end are in one-to-one correspondence with the m protocol entities of the transmitting end, the receiving end may infer a number of a PDU set based on a protocol entity for receiving the PDU set. In this way, the number of the PDU set does not need to be transmitted through an air interface, so that air interface resources can be saved.

In some implementations of the first aspect, the priority of the protocol entity is a priority of a first resource associated with the protocol entity, and the first resource includes one or more of the following: a logical channel, a logical channel group, a slice, a frequency, a data radio bearer (DRB), a quality of service (QOS) flow (flow), a PDU session, or a general packet radio service tunneling protocol for the user plane (GTP-U) tunnel.

For example, the m protocol entities are associated with m logical channels, one protocol entity is associated with one logical channel, and any two protocol entities are associated with different logical channels. In addition, any one of the m logical channels is a logical channel group.

In uplink transmission, when a terminal device has a to-be-sent packet, the terminal device may report, to a network device by using a buffer status report (BSR), a current amount of to-be-transmitted data in a buffer. A BSR trigger condition is that new to-be-transmitted data is generated, and a logical channel to which the to-be-transmitted data belongs is the $1^{st}$ logical channel with to-be-transmitted data in a logical channel group to which the logical channel belongs. In this application, each protocol entity is associated with one logical channel group, and one protocol entity carries only one PDU set at a same moment. Therefore, a BSR is triggered each time a new PDU set arrives at a protocol entity or a logical channel group.

Therefore, based on the foregoing solution, a BSR can be reported at a PDU set granularity without changing a BSR trigger condition or trigger mechanism. Further, the network device can learn of, based on BSR reporting at the PDU set granularity, an amount of to-be-transmitted data in each PDU set, to properly allocate a transmission resource to the PDU set.

According to a second aspect, a data transmission method is provided, including: sequentially receiving k consecutive protocol data unit sets PDU sets; and sequentially delivering the k PDU sets to m protocol entities in a first sequence. When k>m, k−m consecutive PDU sets starting from the $(m+1)^{th}$ PDU set in the k PDU sets are sequentially delivered to the m protocol entities in the first sequence, priorities of the m protocol entities are different from each other, and m>1.

In an implementation, the first sequence is a polling sequence of the $1^{st}$ to the $m^{th}$ protocol entities in the m protocol entities, or the first sequence is an arrangement sequence of the m protocol entities, or the m protocol entities are arranged in the first sequence.

In an implementation, the sequentially delivering k consecutive PDU sets to m protocol entities in a first sequence includes: delivering the $q^{th}$ PDU set in the k PDU sets to the $v^{th}$ protocol entity in the m protocol entities. If $q \bmod m \neq 0$, $v = q \bmod m$, or if $q \bmod m = 0$, $v = m$; and mod represents a modulo operation.

According to the data transmission method provided in this application, the PDU sets are delivered to the m protocol entities in a polling manner in a sequence of the PDU sets. Only one PDU set is delivered to one protocol entity at a same moment, a transmitting end sends the PDU sets in sequence, and a receiving end receives the PDU sets on protocol entities corresponding to the protocol entities of the transmitting end. Therefore, numbers of the PDU sets do not need to be transmitted through an air interface, and the receiving end can also learn of a PDU set to which each PDU that is to be sent, that is being sent, or that has been received belongs, so that air interface resources can be saved.

In some implementations of the second aspect, the protocol entity is any one of the following: a PDCP entity, an RLC entity, an SDAP entity, or a MAC entity.

In some implementations of the second aspect, max, and x is determined based on one or more of the following: a periodicity of the PDU set, validity duration of the PDU set, or maximum duration of the PDU set.

In some implementations of the second aspect, $x=\lceil (T/P)+1 \rceil$, $x=\lceil T/P \rceil+1$, or $x=\lceil (t+T)/P \rceil$, $\lceil \ \rceil$ indicates rounding up, P is the periodicity of the PDU set, T is the validity duration of the PDU set, and t is the maximum duration of the PDU set.

Based on this solution, a quantity of protocol entities is properly set, so that it can be ensured that there is a PDU of only one PDU set in any protocol entity at any moment, and PDUs in two PDU sets are not mixed. Because the m protocol entities used by the receiving end are in one-to-one correspondence with the m protocol entities of the transmitting end, the receiving end may infer a number of a PDU set based on a protocol entity for receiving the PDU set. In this way, the number of the PDU set does not need to be transmitted through an air interface, so that air interface resources can be saved.

In some implementations of the second aspect, the priority of the protocol entity is a priority of a first resource associated with the protocol entity, and the first resource includes one or more of the following: a logical channel, a logical channel group, a slice, a frequency, a data radio bearer DRB, a quality of service flow QoS flow, a PDU session, or a general packet radio service tunneling protocol for the user plane (GTP-U) tunnel.

For example, the m protocol entities are associated with m logical channels, one protocol entity is associated with one logical channel, and any two protocol entities are associated with different logical channels. In addition, any one of the m logical channels is a logical channel group.

In uplink transmission, when a terminal device has a to-be-sent packet, the terminal device may report, to a network device by using a buffer status report (BSR), a current amount of to-be-transmitted data in a buffer. A current protocol stipulates that a BSR trigger condition is that new to-be-transmitted data is generated, and a logical channel to which the to-be-transmitted data belongs is the $1^{st}$ logical channel with to-be-transmitted data in a logical channel group to which the logical channel belongs. In this application, each protocol entity is associated with one logical channel group, and one protocol entity carries only one PDU set at a same moment. Therefore, a BSR is triggered each time a new PDU set arrives at a protocol entity or a logical channel group.

Therefore, based on the foregoing solution, a BSR can be reported at a PDU set granularity without changing a BSR trigger condition or trigger mechanism. Further, the network device can learn of, based on BSR reporting at the PDU set granularity, an amount of to-be-transmitted data in each PDU set, to properly allocate a transmission resource to the PDU set.

According to a third aspect, a communication apparatus is provided and includes a module or unit configured to perform the method in any one of the first aspect or the possible implementations of the first aspect.

According to a fourth aspect, a communication apparatus is provided and includes a module or unit configured to perform the method in any one of the second aspect or the possible implementations of the second aspect.

According to a fifth aspect, a communication apparatus is provided and includes a processor. The processor is coupled to a memory, the memory is configured to store a computer program or instructions, and the processor is configured to execute the computer program or the instructions stored in the memory, to implement the method in any one of the first aspect or the possible implementations of the first aspect.

In a possible implementation, the apparatus further includes the memory coupled to the processor.

In a possible implementation, there are one or more processors and/or one or more memories.

In a possible implementation, the memory and the processor may be integrated together, or the memory and the processor are disposed separately.

In a possible implementation, the apparatus further includes a communication interface, and the processor is coupled to the communication interface.

In an implementation, the apparatus is a transmitting end. For example, the communication interface may be a transceiver or an input/output interface.

In another implementation, the apparatus is a chip in the transmitting end. For example, the communication interface may be an input/output interface.

According to a sixth aspect, a communication apparatus is provided and includes a processor. The processor is coupled to a memory, the memory is configured to store a computer program or instructions, and the processor is configured to execute the computer program or the instructions stored in the memory, to implement the method in any one of the second aspect or the possible implementations of the second aspect.

In a possible implementation, the apparatus further includes the memory coupled to the processor.

In a possible implementation, there are one or more processors and/or one or more memories.

In a possible implementation, the memory and the processor may be integrated together, or the memory and the processor are disposed separately.

In a possible implementation, the apparatus further includes a communication interface, and the processor is coupled to the communication interface.

In an implementation, the apparatus is a receiving end. For example, the communication interface may be a transceiver or an input/output interface.

In another implementation, the apparatus is a chip in the receiving end. For example, the communication interface may be an input/output interface.

According to a seventh aspect, a processor is provided, including an input circuit, an output circuit, and a processing circuit. The processing circuit is configured to receive a signal through the input circuit, and transmit a signal through the output circuit, to enable the processor to perform the method in any one of the first aspect or the possible implementations of the first aspect, or the method in any one of the second aspect or the possible implementations of the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments.

Specific implementations of the processor and various circuits are not limited in this application.

According to an eighth aspect, a communication system is provided and includes the communication apparatuses provided in the third aspect and the fourth aspect, or includes the communication apparatuses provided in the fifth aspect and the sixth aspect.

According to a ninth aspect, a computer program product is provided. The computer program product includes a computer program (or referred to as code or instructions). When the computer program is run, a computer is enabled to perform the method in any one of the first aspect or the possible implementations of the first aspect, or the method in any one of the second aspect or the possible implementations of the second aspect.

According to a tenth aspect, a computer-readable storage medium is provided. The computer-readable storage medium stores a computer program (or referred to as code or instructions). When the computer program is run on a computer, the computer is enabled to perform the method in any one of the first aspect or the possible implementations of the first aspect, or the method in any one of the second aspect or the possible implementations of the second aspect.

BRIEF DESCRIPTION OF THE DRAWINGS

FIG. 3 is a schematic flowchart of a data transmission method according to an embodiment of this application;

FIG. 4 is a diagram of an example of a correspondence between a PDU set and a protocol entity according to an embodiment of this application;

FIG. 5 is a diagram of another example of a correspondence between a PDU set and a protocol entity according to an embodiment of this application;

DETAILED DESCRIPTION OF ILLUSTRATIVE EMBODIMENTS

Figure 1:
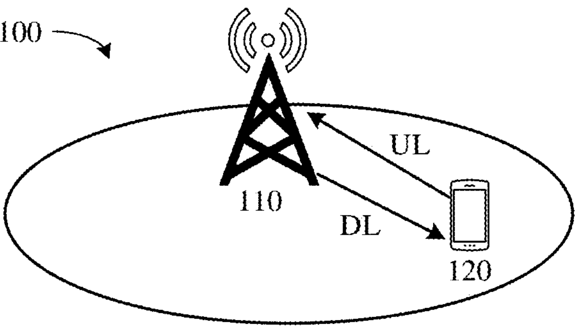
FIG. 1 is a diagram of an example of a communication system according to an embodiment of this application.

The following describes the technical solutions in embodiments of this application with reference to the accompanying drawings in embodiments of this application.

In the descriptions of this application, unless otherwise specified, "/" indicates that associated objects are in an "or" relationship. For example, A/B may represent A or B. The term "and/or" in this application describes only an association relationship for describing associated objects and represents that three relationships may exist. For example, A and/or B may represent the following three cases: Only A exists, both A and B exist, and only B exists. A and B each may be singular or plural. In addition, in the descriptions of this application, "a plurality of" means two or more than two. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

It should be understood that, in this application, descriptions similar to "in a case of . . . " "when . . . ", "if . . . ", and the like may be used interchangeably.

The technical solutions in embodiments of this application may be applied to various communication systems, for example, a long term evolution (LTE) system, a 5th generation (5G) mobile communication system, a new radio (NR) mobile communication system, and another mobile communication system that may appear in the future.

For example, the technical solutions in embodiments of this application may be applied to uplink communication, downlink communication, and vehicle to everything (V2X) scenarios. For example, V2X may be specifically any one of the following: vehicle to vehicle (V2V) communication, vehicle to pedestrian (V2P) communication, a vehicle to network (V2N) service, or vehicle to infrastructure (V2I) communication.

When the method provided in this application is applied to the uplink (UL) transmission (or uplink communication) scenario, a transmitting end in this application corresponds to a terminal device, and a receiving end corresponds to a network device. For example, the transmitting end may be the terminal device, a chip configured in the terminal device, or a module configured in the terminal device, and the receiving end may be the network device, a chip configured in the network device, or a module configured in the network device.

When the method provided in this application is applied to the downlink (DL) transmission (or downlink communication) scenario, a transmitting end in this application corresponds to a network device, and a receiving end corresponds to a terminal device. For example, the transmitting end may be the network device, a chip configured in the network device, or a module configured in the network device, and the receiving end may be the terminal device, a chip configured in the terminal device, or a module configured in the terminal device.

When the method provided in this application is applied to the V2X scenario, a transmitting end in this application corresponds to one terminal device, and a receiving end corresponds to the other terminal device. For example, both the transmitting end and the receiving end may be terminal devices, chips configured in the terminal devices, or modules configured in the terminal devices. In addition, the two terminal devices may be of a same type or different types. For example, the two terminal devices may be both mobile phones, or one is a mobile phone, and the other is a notebook computer.

The terminal device in embodiments of this application may be user equipment (UE), a station (station), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

A network device in embodiments of this application may be a device configured to communicate with a terminal device. For example, the network device may be a base station, an evolved NodeB (eNodeB), a transmission reception point (TRP), a next generation NodeB (gNB) in a 5G mobile communication system, a base station in a future mobile communication system, or an access point (AP) in a Wi-Fi system. For another example, the network device may alternatively be a module or unit that completes a part of functions of a base station, for example, may be a central unit (CU) or a distributed unit (DU). For still another example, the network device may alternatively be a radio controller in a cloud radio access network (CRAN) scenario, a relay station, an access point, a vehicle-mounted device, a wearable device, or an access network device in another future evolved communication system. A specific technology and a specific device form used by a network device are not limited in this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

FIG. 1 is a block diagram of a communication system applicable to this application. As shown in FIG. 1, the communication system 100 may include at least one network device, for example, a network device 110 shown in FIG. 1. The communication system 100 may further include at least one terminal device, for example, a terminal device 120 shown in FIG. 1. A signal may be transmitted between the network device 110 and the terminal device 120. Sending a signal by the network device 110 to the terminal device 120 is referred to as downlink transmission, and sending a signal by the terminal device 120 to the network device 110 is referred to as uplink transmission.

It should be understood that, when the communication method in this application is applied to the communication system shown in FIG. 1, in an uplink transmission scenario, a transmitting end may be the terminal device 120, and a receiving end may be the network device 110; and in a downlink transmission scenario, a transmitting end may be the network device 110, and a receiving end may be the terminal device 120.

Figure 2:
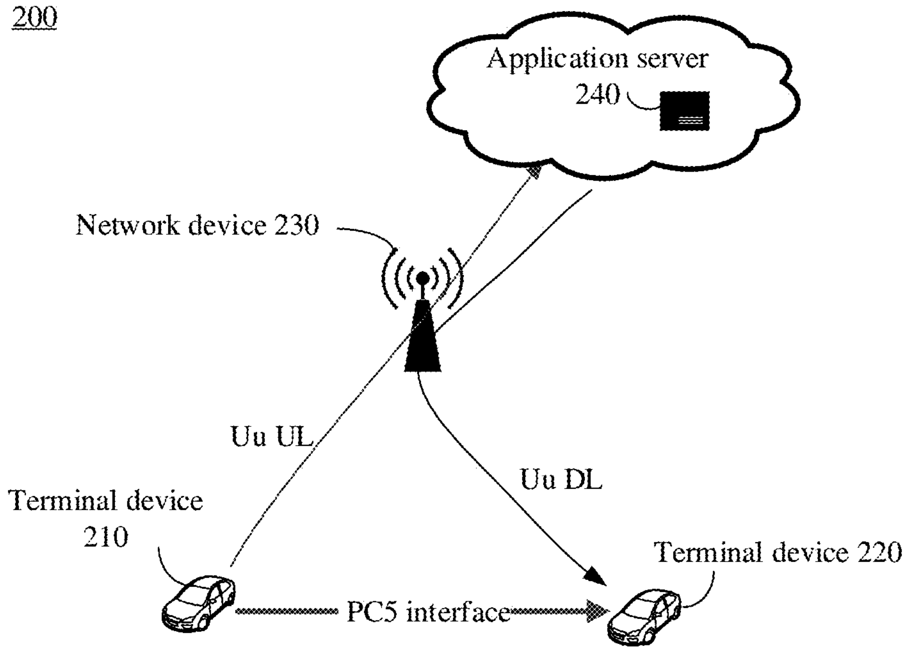
FIG. 2 is a diagram of another example of a communication system according to an embodiment of this application.

FIG. 2 is a diagram of another communication system applicable to this application. A system 200 shown in FIG. 2 is a V2X communication architecture. Refer to FIG. 2. The system 200 includes two types of communication interfaces: a PC5 interface and a Uu interface. The PC5 interface is a direct communication interface between two terminal devices (for example, a terminal device 210 and a terminal device 220 shown in the figure). The direct communication link between the terminal devices is also defined as a side link or a sidelink (SL). Uu interface communication is a communication mode in which a transmitter terminal device (for example, the terminal device 210) sends V2X data to a network device 230 through the Uu interface, the network device 230 sends the V2X data to an application server 240 for processing, the application server 240 delivers processed V2X data to the network device 230, and the network device 230 sends the processed V2X data to a receiver terminal device (for example, the terminal device 220). In the Uu interface communication mode, a network device that forwards uplink data from the transmitter terminal device to the application server and a network device that forwards downlink data delivered by the application server to the receiver terminal device may be a same network device, or may be different network devices. This may be specifically determined by the application server. It should be understood that sending by the transmitter terminal device to the network device is referred to as uplink (UL) transmission, and sending by the network device to the receiver terminal device is referred to as downlink (DL) transmission.

It should be understood that, when the communication method in this application is applied to the communication system shown in FIG. 2, a transmitting end may be the terminal device 210, and a receiving end may be the terminal device 220; or a transmitting end may be the terminal device 220, and a receiving end may be the terminal device 210.

It should be further understood that the communication systems shown in FIG. 1 and FIG. 2 may further include more network nodes, for example, more terminal devices or network devices. The network nodes are not shown one by one in the figures in embodiments of this application.

Before the method provided in this application is described in detail, the following first briefly describes some concepts.

1. PDU and Packet

In this application, the PDU and the packet may be replaced with each other, and a PDU may also be referred to as a packet.

2. PDU Set

One frame (or one frame of picture) includes one or more PDUs, and the one or more PDUs may be referred to as one PDU set. Therefore, it may also be understood that a PDU set is a frame.

PDU sets are periodic. For example, a frame rate is 60 fps. That is, 60 PDU sets are transmitted per second. A periodicity of a PDU set is 1/60 seconds (approximately equal to 16.67 ms). That is, one PDU set appears every 1/60 seconds. fps indicates frames per second (frames per second).

In addition, the PDU set has a transmission delay requirement. In an example, a packet delay budget (PDB) may represent the transmission delay requirement of the PDU set. For example, it is assumed that a PDB is 30 ms. In this case, if a PDU set is not successfully sent to a receiving end within 30 ms, a transmitting end may discard the PDU set, and does not need to send, to the transmitting end, a PDU that is not successfully sent in the PDU set.

The following describes in detail a method embodiment provided in this application.

FIG. 3 is a schematic flowchart of a data transmission method according to this application. The method 300 may include S310 to S330.

S310: A transmitting end sequentially delivers k consecutive PDU sets to m protocol entities in a first sequence.

When k>m, k−m consecutive PDU sets starting from the $(m+1)^{th}$ PDU set in the k PDU sets are sequentially delivered to the m protocol entities in the first sequence. Priorities of the m protocol entities are different from each other, and m>1. For example, the first sequence is a polling sequence of the $1^{st}$ to the $m^{th}$ protocol entities in the m protocol entities, or the first sequence is an arrangement sequence of the m protocol entities, or the m protocol entities are arranged in the first sequence.

In an implementation, the sequentially delivering k consecutive PDU sets to m protocol entities in a first sequence includes: delivering the $q^{th}$ PDU set in the k PDU sets to the $v^{th}$ protocol entity in the m protocol entities. If q mod m≠0, v=q mod m, or if q mod m=0, v=m; and mod represents a modulo operation.

S310 is described by using an example in which m=3. Specifically, the transmitting end may deliver the $1^{st}$ PDU set to the $1^{st}$ protocol entity, the $2^{nd}$ PDU set to the $2^{nd}$ protocol entity, and the $3^{rd}$ PDU set to the $3^{rd}$ protocol entity. After polling of the three protocol entities is completed, delivery of a PDU set continues starting from the $1^{st}$ protocol entity. To be specific, the 4th PDU set is delivered to the $1^{st}$ protocol entity, the 5th PDU set is delivered to the $2^{nd}$ protocol entity, and the 6th PDU set is delivered to the $3^{rd}$ protocol entity. Similarly, after polling of the three protocol entities is completed, delivery of a subsequent PDU set continues starting from the $1^{st}$ protocol entity. To be specific, the 7th PDU set is delivered to the $1^{st}$ protocol entity, and so on.

For example, it is assumed that the k PDU sets are a PDU set 1 and a PDU set 2, a number of the PDU set 1 is 1, a number of the PDU set 2 is 2, and the m protocol entities are a protocol entity 1, a protocol entity 2, and a protocol entity 3. Refer to FIG. 4. The transmitting end may deliver the PDU set 1 to the protocol entity 1 and deliver the PDU set 2 to the protocol entity 2 based on the frame numbers of the PDU sets.

For another example, it is assumed that the k PDU sets are a PDU set 1 to a PDU set 10, numbers of the PDU set 1 to the PDU set 10 are 1 to 10, and the m protocol entities are a protocol entity 1, a protocol entity 2, and a protocol entity 3. Refer to FIG. 5. Based on the numbers of the PDU sets, the transmitting end may deliver the PDU set 1, the PDU set 4, the PDU set 7, and the PDU set 10 to the protocol entity 1, deliver the PDU set 2, the PDU set 5, and the PDU set 8 to the protocol entity 2, and deliver the PDU set 3, the PDU set 6, and the PDU set 9 to the protocol entity 3.

For example, a number of a PDU set may be carried in a PDU in the PDU set, or may be indicated in another manner. For example, the number of the PDU set may be indicated by a control plane packet, or the number of the PDU set may be indicated by a PDU that carries the number of the PDU set. The control plane packet or the PDU may be, for example, a start marker/end marker. A manner in which a protocol entity obtains the number of the PDU set is not limited in this application. In addition, it should be understood that the number of the PDU set may alternatively be replaced with information such as an index or a sequence number of the PDU set that can indicate a PDU sequence. The information that can indicate a PDU sequence, for example, the number of the PDU set, may start from 1, or may start from another number, for example, start from 0, or start from a number obtained by adding 1 to a number of a last PDU set of a previous XR service.

In some embodiments, the k PDU sets correspond to a same XR service.

In some embodiments, the protocol entity may be any one of the following: a PDCP entity, an RLC entity, an SDAP entity, or a MAC entity.

In some embodiments, delivering a PDU set to a protocol entity may also be described as: storing the PDU set in a cache/window/queue/buffer/memory/storage/register/storage space corresponding to the protocol entity corresponding to the PDU set.

S320: The transmitting end sequentially sends the k PDU sets. Correspondingly, the receiving end sequentially receives the k PDU sets.

That is, the transmitting end sends the k PDU sets in a sequence of the k PDU sets. For example, if the k PDU sets are the PDU set 1 to the PDU set 10 shown in FIG. 5, the PDU set 1 is first sent, then the PDU set 2 is sent, and then the PDU set 3, the PDU set 4, . . . , the PDU set 9, and the PDU set 10 are sent. Correspondingly, the receiving end first receives the PDU set 1, then receives the PDU set 2, and then receives the PDU set 3, the PDU set 4, . . . , the PDU set 9, and the PDU set 10.

In some embodiments, one PDU set may be first sent completely, and then another PDU set is sent. For example, a prioritized bit rate (PBR) of a logical channel associated with a protocol entity may be set to Infinity. This can ensure that a PDU in a protocol entity is scheduled only after all PDUs in another protocol entity have been scheduled.

It should be noted that, in this application, "sequentially" means that all PDUs in a PDU set are processed, and then a PDU in a next PDU set is processed. However, sequences followed by sequential processing (delivery inside the transmitting end, sending at the transmitting end, and delivery inside the receiving end) may be different. Specifically, a first sequence followed by delivery may be different from a sending sequence. During sending, a PDU set in a protocol entity with a highest priority may be first sent.

S330: The receiving end sequentially delivers the k PDU sets to m protocol entities in the first sequence.

Figure 6:
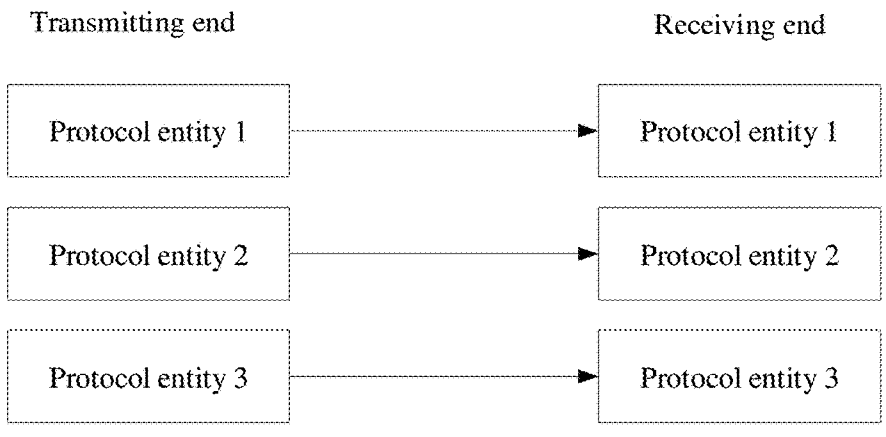
FIG. 6 is a diagram of an example of a correspondence between protocol entities of a transmitting end and protocol entities of a receiving end according to an embodiment of this application.

The m protocol entities of the receiving end are in one-to-one correspondence with the m protocol entities of the transmitting end. For example, refer to FIG. 6. A protocol entity 1 of the transmitting end corresponds to a protocol entity 1 of the receiving end, a protocol entity 2 of the transmitting end corresponds to a protocol entity 2 of the receiving end, and a protocol entity 3 of the transmitting end corresponds to a protocol entity 3 of the receiving end. After receiving a PDU set sent by the transmitting end on the protocol entity 1 of the transmitting end, the receiving end delivers the PDU set to the protocol entity 1 of the receiving end. After receiving a PDU set sent by the transmitting end on the protocol entity 2 of the transmitting end, the receiving end delivers the PDU set to the protocol entity 2 of the receiving end. After receiving a PDU set sent by the transmitting end on the protocol entity 3 of the transmitting end, the receiving end delivers the PDU set to the protocol entity 3 of the receiving end.

S330 is described by using an example in which the k PDU sets are a PDU set 1 to a PDU set 10, and the protocol entity is a PDCP entity. In S330, an RLC layer of the transmitting end sequentially receives the PDCP set 1, the PDU set 4, the PDU set 7, and the PDU set 10 from a MAC layer. After receiving each PDU set, the MAC layer processes the PDU set, and then delivers a processed PDU set to a PDCP entity 1 of the receiving end. The PDCP entity 1 separately processes the PDCP set 1, the PDU set 4, the PDU set 7, and the PDU set 10 that are processed by the RLC layer. Similarly, the RLC layer of the transmitting end sequentially receives the PDCP set 2, the PDU set 5, and the PDU set 8 from the MAC layer. After receiving each PDU set, the MAC layer processes the PDU set, and then delivers a processed PDU set to a PDCP entity 2 of the receiving end. The PDCP entity 2 separately processes the PDCP set 2, the PDU set 5, and the PDU set 8 that are processed by the RLC layer. The RLC layer of the transmitting end sequentially receives the PDCP set 3, the PDU set 6, and the PDU set 9 from the MAC layer. After receiving each PDU set, the MAC layer processes the PDU set, and then delivers a processed PDU set to a PDCP entity 3 of the receiving end. The PDCP entity 3 separately processes the PDCP set 3, the PDU set 6, and the PDU set 9 that are processed by the RLC layer.

It should be understood that, for how the MAC layer, the RLC layer, and the PDCP layer process the PDCP set, refer to existing data processing manners of the MAC layer, the RLC layer, and the PDCP layer. Details are not described herein. In addition, a subsequent operation performed after the PDCP layer processes the PDU set is not specifically limited in this application.

According to the data transmission method provided in this application, the PDU sets are delivered to the m protocol entities in a polling manner in a sequence of the PDU sets. Only one PDU set is delivered to one protocol entity at a same moment, the transmitting end sends the PDU sets in sequence, and the receiving end receives the PDU sets on protocol entities corresponding to the protocol entities of the transmitting end. Therefore, numbers of the PDU sets do not need to be transmitted through an air interface, and the receiving end can also learn of a PDU set to which each PDU that is to be sent, that is being sent, or that has been received belongs, so that air interface resources can be saved.

In some embodiments, $m>x$, and x is determined based on one or more of the following: a periodicity of the PDU set, validity duration of the PDU set, or maximum duration of the PDU set.

For ease of understanding and description, the periodicity of the PDU set, the validity duration of the PDU set, and the maximum duration of the PDU set are respectively denoted as P, T, and t.

$P=1/f$, and f represents a frame rate of the k PDU sets or a service corresponding to the k PDU sets, or a quantity of PDU sets in a unit of time.

T: If a PDU set is not successfully sent to the receiving end after T, the transmitting end may discard the PDU set. Alternatively, even if a PDU in the PDU set is successfully sent to the receiving end after T, the PDU is useless to the receiving end.

In an example, T may be defined as the PDB described above, or may be defined as an access network (AN) PDB or a core network (CN) PDB.

In another example, T may be duration of a discard timer of a protocol entity, and the discard timer may be a timer related to a PDU set, or may be a timer related to a PDU in a PDU set.

t: a time interval between a moment at which the transmitting end receives the 1$^{st}$ PDU/1$^{st}$ byte/1$^{st}$ bit in the PDU set and a moment at which the transmitting end receives the last PDU/last byte/last bit in the PDU set, or (maximum value/minimum value/average value of) a time interval between the 1$^{st}$ PDU/1$^{st}$ byte/1$^{st}$ bit (bit) in the PDU set and the last PDU/last byte/last bit in the PDU set.

Further, $x=\lceil (T/P)+1 \rceil$, $x=\lceil T/P \rceil+1$, or $x=\lceil (t+T)/P \rceil$, where $\lceil\ \rceil$ represents rounding up.

For example, $x=\lceil (T/P)+1 \rceil$ or $x=\lceil T/P \rceil+1$ may be applied to a scenario in which a PDU in a PDU set may arrive at any time during P.

For another example, $x=\lceil (t+T)/P \rceil$ may be applied to a scenario in which all PDUs in a PDU set arrive at once at the earliest during P, and duration of the PDU set does not exceed t.

The following uses 60 fps as an example. To be specific, one PDU set arrives every 16.67 ms, and it is assumed that validity duration of each PDU set is 30 ms. A value design principle of x is described with reference to FIG. 7 and FIG. 8.

Figure 7:
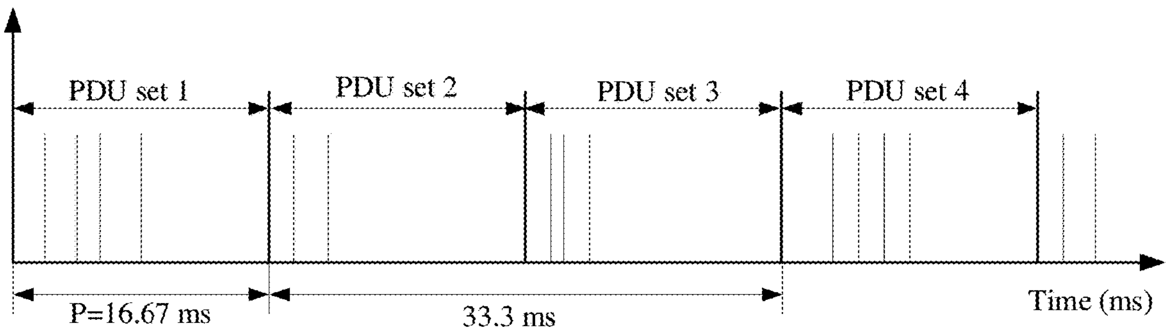
FIG. 7 is a diagram of an example of distribution of PDU sets in time domain according to an embodiment of this application.

Refer to FIG. 7. A PDU in a PDU set may arrive at any time in a time period of 16.67 ms (for example, the last PDU in a PDU set may arrive at the last moment of in a 16.67 periodicity). A sum of two periodicities is 33.3 ms, and is greater than invalidity duration. Therefore, when a PDU set 4 arrives, the PDU set 1 has been transmitted, or the PDU set 1 is invalid because the validity duration expires. In this case, the PDU set 1 may be delivered to a protocol entity 1, a PDU set 2 may be delivered to a protocol entity 2, and a PDU set 3 may be delivered to a protocol entity 3. When the PDU set 4 arrives, the PDU set 1 has been scheduled completely. Even if the PDU set 1 is not scheduled completely, the PDU set 1 is invalid and therefore is discarded. Therefore, the PDU set 4 may be delivered to the protocol entity 1, and a PDU set 5 may be delivered to the protocol entity 2. Such cyclic scheduling can ensure that there is a PDU of only one PDU set in any protocol entity at any moment, and PDUs in two PDU sets are not mixed.

Figure 8:
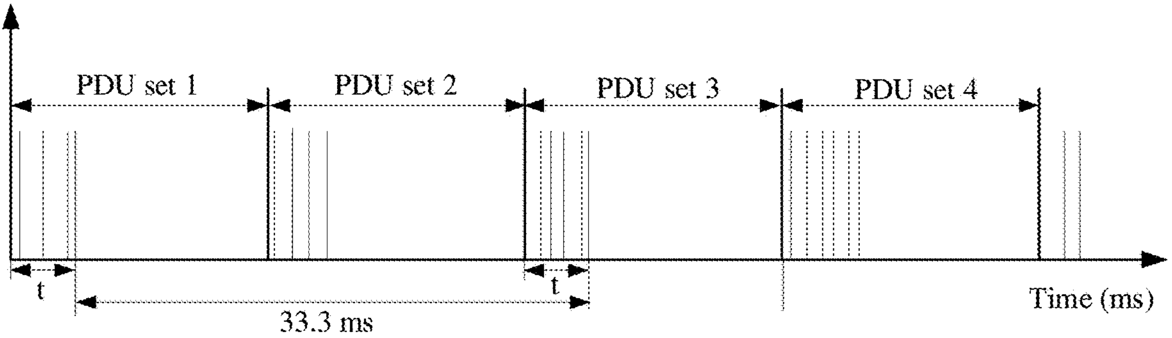
FIG. 8 is a diagram of another example of distribution of PDU sets in time domain according to an embodiment of this application.

Refer to FIG. 8. In a scenario in which all PDUs in a PDU set arrive at once at the earliest during P, and duration of the PDU set does not exceed t, time elapsed since all PDUs in a PDU set 1 arrive until all PDUs in a PDU set 3 arrive is exactly two 16.67 ms periodicities. In other words, the PDU set 3 is received completely 33.3 ms after the PDU set 1 arrives (in this case, the PDU set 1 is invalid). Because T is not 33.3 ms but 30 ms, as long as $t \leq 3.3$ ms, it can be ensured that the 1st PDU in the PDU set 3 just arrives upon the last PDU in the PDU set 1 is received for 30 ms and is just invalid. In this case, the PDU set 3 may be delivered to the protocol entity in which the PDU set 1 is located. Therefore, in this case, only two protocol entities can ensure that there is a PDU of only one PDU set in any protocol entity at any moment, and PDUs in two PDU sets are not mixed.

In conclusion, based on this solution, a quantity of protocol entities is properly set, so that it can be ensured that there is a PDU of only one PDU set in any protocol entity at any moment, and PDUs in two PDU sets are not mixed. Because the m protocol entities used by the receiving end are in one-to-one correspondence with the m protocol entities of the transmitting end, the receiving end may infer a number of a PDU set based on a protocol entity for receiving the PDU set. In this way, the number of the PDU set does not need to be transmitted through an air interface, so that air interface resources can be saved.

In addition, in some embodiments, the m protocol entities are associated with m logical channels, one protocol entity is associated with one logical channel, and any two protocol entities are associated with different logical channels. In addition, any one of the m logical channels is a logical channel group.

For example, the m protocol entities are a protocol entity 1, a protocol entity 2, and a protocol entity 3, the protocol entity 1 is associated with a logical channel 1, the protocol entity 2 is associated with a logical channel 2, and the protocol entity 3 is associated with a logical channel 3. The logical channel 1 is a logical channel group 1, the logical channel 2 is a logical channel group 2, and the logical channel 3 is a logical channel group 3.

In uplink transmission, when a terminal device has a to-be-sent packet, the terminal device may report, to a network device by using a buffer status report (buffer status report, BSR), a current amount of to-be-transmitted data in a buffer. A current protocol stipulates that a BSR trigger condition is that new to-be-transmitted data is generated, and a logical channel to which the to-be-transmitted data belongs is the 1st logical channel with to-be-transmitted data in a logical channel group to which the logical channel belongs. In this application, each protocol entity is associated with one logical channel group, and one protocol entity carries only one PDU set at a same moment. Therefore, a BSR is triggered each time a new PDU set arrives at a protocol entity or a logical channel group.

Therefore, according to the solution of this application, a BSR can be reported at a PDU set granularity without changing a BSR trigger condition or trigger mechanism. Further, the network device can learn of, based on BSR reporting at the PDU set granularity, an amount of to-be-transmitted data in each PDU set, to properly allocate a transmission resource to the PDU set.

In some embodiments, before the 1st PDU set in the k PDU sets is sent, priorities of the m protocol entities are in descending order.

For ease of understanding a priority of a protocol entity described in this application, the priority of the protocol entity is represented by a number in this application, and it is assumed that a smaller number indicates a higher priority.

In an example, that the priorities of the m protocol entities are in descending order may be that the priorities of the m protocol entities are sequentially decreased by one level. For example, the priorities of the m protocol entities are 1, 2, 3, . . . , and m.

In an example, that the priorities of the m protocol entities are in descending order may be that a priority of the $z^{th}$ protocol entity in the m protocol entities is higher than a priority of the $(z+1)^{th}$ protocol entity, but priorities of the $z^{th}$ protocol entity and the $(z+1)^{th}$ protocol entity may be inconsecutive, where z is any integer in 1 to m−1. For example, assuming that m=3, the priorities of the m protocol entities may be 1, 3, and 4, or priorities of the m protocol entities may be 2, 4, and 7.

Optionally, a priority of any protocol entity is a priority of a first resource associated with the protocol entity. The first resource may include one or more of the following: a logical channel, a logical channel group, a slice, a frequency, a DRB, a QoS flow, a PDU session, or a GTP-U tunnel.

The following describes in detail some embodiments related to S320.

Embodiment 1

S320 may specifically include: sequentially sending the k PDU sets by using a transmission resource; and adjusting the priorities of the m protocol entities if a current transmission resource is exhausted or less than a first preset value.

Uplink transmission is used as an example for description. After the transmitting end reports a BSR to the receiving end, the receiving end may allocate a transmission resource to the transmitting end. For example, the BSR reported by the transmitting end for the first time is an amount of to-be-transmitted data of a PDU set 1, and the receiving end allocates a transmission resource 1 for transmitting the PDU set 1. After the transmitting end transmits the PDU set 1 completely, if the transmission resource 1 remains and a remaining transmission resource (denoted as a transmission resource 1a) is greater than the first preset value, the transmitting end may transmit a PDU set 2 by using the transmission resource 1a. After the transmitting end transmits the PDU set 2 completely, if the transmission resource 1 is exhausted, that is, the transmission resource 1a is used up, or if the transmission resource 1a remains but a remaining transmission resource (denoted as a transmission resource 1b) is less than the first preset value, the priorities of the m protocol entities are adjusted. After the transmitting end transmits the PDU set 2 completely, if the transmission resource 1a remains and the remaining transmission resource 1b is not exhausted or is greater than the first preset value, the transmitting end may continue to transmit a PDU set 3 by using the transmission resource 1b. If the transmission resource 1b is exhausted or a remaining transmission resource in the transmission resource 1b is less than the first preset value after a part of PDUs in the PDU set 3 are transmitted, the priorities of the m protocol entities are adjusted.

When or after the priorities are adjusted, the receiving end may allocate a resource to the transmitting end again, and the transmitting end may continue to transmit, by using the resource allocated by the receiving end this time, a PDU set or a PDU of a PDU set that has not been transmitted or has not been successfully transmitted.

It should be understood that the transmission resource may be a time-frequency resource. In addition, the first preset value may be specified in a protocol, or may be preconfigured. This is not limited in this application.

Based on Embodiment 1, in an example, if the current transmission resource is insufficient to send the $s^{th}$ PDU set in the k PDU sets completely, a priority of a protocol entity corresponding to the $s^{th}$ PDU set is adjusted to highest.

For example, as described above, if the transmission resource 1b is exhausted or a remaining transmission resource in the transmission resource 1b is less than the first preset value after a part of the PDUs in the PDU set 3 are transmitted, a priority of a protocol entity corresponding to the PDU set 3 is adjusted to highest.

Based on this solution, after obtaining a transmission resource again, the receiving end may first send a remaining PDU in the $s^{th}$ PDU set that is being transmitted before, to ensure that the PDU sets are sent in sequence.

Further, in addition to adjusting the priority of the protocol entity corresponding to the $s^{th}$ PDU set to highest, priorities of other m−1 protocol entities in the m protocol entities may also be adjusted.

For example, when [j+(a−b)+m] mod m+0, an adjusted priority of the $j^{th}$ protocol entity in the m protocol entities is an unadjusted priority of the $([j+(a-b)+m] \bmod m)^{th}$ protocol entity in the m protocol entities. When [j+(a−b)+m] mod m=0, an adjusted priority of the $j^{th}$ protocol entity in the m protocol entities is an unadjusted priority of the $m^{th}$ protocol entity in the m protocol entities. The $a^{th}$ protocol entity in the m protocol entities is used to carry the $s^{th}$ PDU set, and before the adjustment, the $b^{th}$ protocol entity in the m protocol entities is a protocol entity with a highest priority in the m protocol entities, where $1 \le a \le m$, and $1 \le b \le m$.

For example, the m protocol entities are a protocol entity 1, a protocol entity 2, and a protocol entity 3. Before adjustment, the protocol entity 1 has a highest priority, and the protocol entity corresponding to the $s^{th}$ PDU set is the protocol entity 3. In this case, an adjusted priority of the protocol entity 3 is an unadjusted priority of the protocol entity 1, an adjusted priority of the protocol entity 1 is an unadjusted priority of the protocol entity 2, and an adjusted priority of the protocol entity 2 is an unadjusted priority of the protocol entity 3.

For example, the m protocol entities are a protocol entity 1, a protocol entity 2, and a protocol entity 3. Before adjustment, the protocol entity 2 has a highest priority, and the protocol entity corresponding to the $s^{th}$ PDU set is the protocol entity 3. In this case, an adjusted priority of the protocol entity 3 is an unadjusted priority of the protocol entity 2, an adjusted priority of the protocol entity 1 is an unadjusted priority of the protocol entity 3, and an adjusted priority of the protocol entity 2 is an unadjusted priority of the protocol entity 1.

Based on Embodiment 1, in another example, if the current transmission resource is used to send the $s^{th}$ PDU set completely but is insufficient to send the $(s+1)^{th}$ PDU set, a priority of a protocol entity corresponding to the $(s+1)^{th}$ PDU set is adjusted to highest.

For example, as described above, after the transmitting end transmits the PDU set 2 completely, if the transmission resource 1 is exhausted, that is, the transmission resource 1a is used up, or if the transmission resource 1a remains but a remaining transmission resource is less than the first preset value, a priority of a protocol entity corresponding to the PDU set 3 is adjusted to highest.

Based on this solution, after obtaining a transmission resource again, the receiving end may first send the $(s+1)^{th}$ PDU set, to ensure that the PDU sets are sent in sequence.

Further, in addition to adjusting the priority of the protocol entity corresponding to the $(s+1)^{th}$ PDU set to highest, priorities of other m−1 protocol entities in the m protocol entities may also be adjusted.

For example, when [j+(a−b)+m] mod m+0, an adjusted priority of the $j^{th}$ protocol entity in the m protocol entities is an unadjusted priority of the $([j+(a-b)+m] \bmod m)^{th}$ protocol entity in the m protocol entities. When [j+(a−b)+m] mod m=0, an adjusted priority of the $j^{th}$ protocol entity in the m protocol entities is an unadjusted priority of the $m^{th}$ protocol entity in the m protocol entities. The $a^{th}$ protocol entity in the m protocol entities is used to carry the $(s+1)^{th}$ PDU set, and before the adjustment, the $b^{th}$ protocol entity in the m protocol entities is a protocol entity with a highest priority in the m protocol entities, where $1 \le a \le m$, and $1 \le b \le m$.

For example, the m protocol entities are a protocol entity 1, a protocol entity 2, and a protocol entity 3. Before adjustment, the protocol entity 1 has a highest priority, and the protocol entity corresponding to the $(s+1)^{th}$ PDU set is the protocol entity 3. In this case, an adjusted priority of the protocol entity 3 is an unadjusted priority of the protocol entity 1, an adjusted priority of the protocol entity 1 is an unadjusted priority of the protocol entity 2, and an adjusted priority of the protocol entity 2 is an unadjusted priority of the protocol entity 3.

For example, the m protocol entities are a protocol entity 1, a protocol entity 2, and a protocol entity 3. Before adjustment, the protocol entity 2 has a highest priority, and the protocol entity corresponding to the $(s+1)^{th}$ PDU set is the protocol entity 3. In this case, an adjusted priority of the protocol entity 3 is an unadjusted priority of the protocol entity 2, an adjusted priority of the protocol entity 1 is an unadjusted priority of the protocol entity 3, and an adjusted priority of the protocol entity 2 is an unadjusted priority of the protocol entity 1.

Embodiment 2

S320 may specifically include: adjusting the priorities of the m protocol entities after each PDU set is sent completely.

The unadjusted priorities of the m protocol entities are sequentially m1, m2, . . . , and mm, and adjusted priorities of the m protocol entities are sequentially mm, m1, . . . , and m (m−1). In other words, when $2 \le j \le m$, the adjusted priority of the $j^{th}$ protocol entity in the m protocol entities is an unadjusted priority of the $(j-1)^{th}$ protocol entity in the m protocol entities. When j=1, an adjusted priority of the $1^{st}$ protocol entity in the m protocol entities is an unadjusted priority of the $m^{th}$ protocol entity in the m protocol entities.

Specifically, after a PDU set 1 is sent completely, the priorities of the m protocol entities are adjusted. After a PDU set 2 is sent completely, the priorities of the m protocol entities are adjusted again. After a PDU set 3 is sent completely, the priorities of the m protocol entities continue to be adjusted until the k PDU sets are sent completely.

Figure 9:
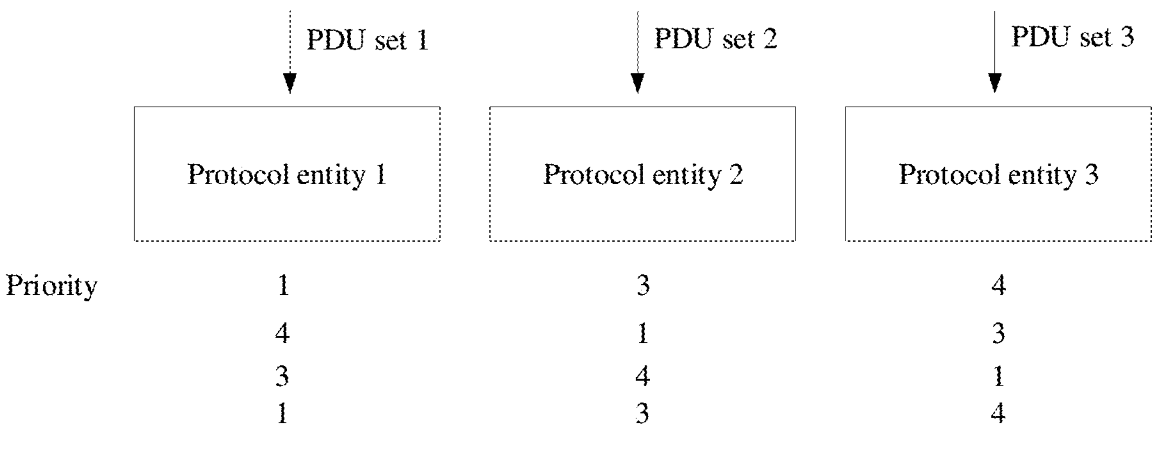
FIG. 9 is a diagram of an example of adjusting priorities of protocol entities according to an embodiment of this application.

An example is used for description with reference to FIG. 9. Refer to FIG. 9. The m protocol entities are a protocol entity 1, a protocol entity 2, and a protocol entity 3. Before the PDU set 1 is sent, priorities of the protocol entity 1, the protocol entity 2, and the protocol entity 3 are respectively 1, 3, and 4. After sending the PDU set 1 completely, the transmitting end adjusts the priorities of the three protocol entities. Adjusted priorities of the protocol entity 1, the protocol entity 2, and the protocol entity 3 are respectively 4, 1, and 3. After sending the PDU set 2 completely, the transmitting end adjusts the priorities of the three protocol entities. Adjusted priorities of the protocol entity 1, the protocol entity 2, and the protocol entity 3 are respectively 3, 4, and 1. After sending the PDU set 3 completely, the transmitting end adjusts the priorities of the three protocol entities. Adjusted priorities of the protocol entity 1, the protocol entity 2, and the protocol entity 3 are respectively 1, 3, and 4. Another PDU set is similar, and details are not described herein again.

Embodiment 3

In a process of sequentially sending the k PDU sets, if the $w^{th}$ PDU set in the k PDU sets is invalid, a PDU that is not successfully transmitted in the $w^{th}$ PDU set is discarded, where $w \geq 1$.

It should be understood that, in this application, that the PDU set is invalid may be any one of the following: a PDCP discard timer associated with a PDU in the PDU set expires, a discard timer of the PDU set expires, a PDU set in a protocol entity associated with the PDU set has not been sent completely but another subsequent PDU set has been received, a PDU in the PDU set has not been sent completely within validity duration of the PDU set, a proportion of PDUs that are in the PDU set and that are not sent within the validity duration of the PDU set exceeds a specific value, the PDU set is not sent within expected time, the PDU set is not received by the receiving end within expected time, or an ACK response for the PDU set is not received from the receiving end within expected time.

Embodiment 3 is described by using an example in which the m protocol entities are three protocol entities. It can be learned from the foregoing corresponding descriptions of FIG. 7 that, when the PDU set 4 arrives, if the PDU set 1 is not sent completely, the PDU set 1 is invalid. In this case, a PDU that is not successfully transmitted in the PDU set 1 may be discarded. Similarly, when a PDU set 7 arrives, if the PDU set 4 is not sent completely, the PDU set 4 is invalid. In this case, a PDU that is not successfully transmitted in the PDU set 4 may be discarded.

Further, at least one PDU set may be discarded. The at least one PDU set is the $(w+1)^{th}$ PDU set to the $(w+e)^{th}$ PDU set, and $e \geq 1$. The at least one PDU set is of a first type and is associated with the $w^{th}$ PDU set, both the $w^{th}$ PDU set and the $(w+e+1)^{th}$ PDU set are of a second type, and the first type is different from the second type.

Figure 10:
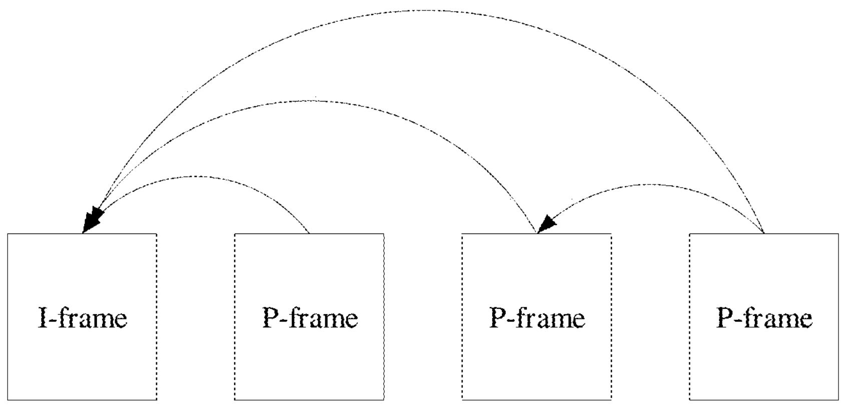
FIG. 10 is a diagram of an example of a dependency relationship between PDU sets according to an embodiment of this application.

There is a dependency relationship between some PDU sets. For example, refer to a plurality of frames shown in FIG. 10. An I-frame carries complete information, and a P-frame can be successfully decoded only by depending on the I-frame. Therefore, if the I-frame fails to be transmitted, the P-frame that depends on the I-frame does not need to be transmitted. In addition, there is a dependency relationship between P frames. For example, the last P frame can be successfully decoded only by depending on a previous P frame. In this case, if the $w^{th}$ PDU set is invalid and therefore is discarded, and one or more PDU sets after the $w^{th}$ PDU set need to depend on the $w^{th}$ PDU set, the one or more PDU sets that depend on the $w^{th}$ PDU set may be discarded.

Based on this solution, some PDU sets associated with an invalid PDU set are discarded, so that transmission resources can be saved without affecting data recovery at the receiving end.

In an example, the first type may be a P-frame, and the second type is not a P-frame, for example, an I-frame.

In another example, the first type is a P-slice, and the second type is not a P-slice. Alternatively, the first type is a PDU set that can be discarded, and the second type is a PDU set that cannot be discarded. Alternatively, the first type is an unimportant PDU set, and the second type is an important PDU set. Alternatively, the first type is a PDU set carrying video data, and the second type is a PDU set carrying voice data. Alternatively, the first type is a PDU set carrying non-control information, and the second type is a PDU set carrying control information. Alternatively, the first type is a PDU set with a lower priority, and the second type is a PDU set with a higher priority. Alternatively, the first type is a dependent PDU set, and the second type is a depended PDU set.

For example, if the PDU set 1 is not a P-frame, for example, is an I-frame, and some PDUs in the PDU set 1 are not successfully transmitted but are invalid, the PDU set 1 may be discarded. If the PDU set 2 is a P-frame, the PDU set 2 may also be discarded. If the PDU set 3 is an I-frame, the PDU set 3 is not discarded. If the PDU set 3 is a P-frame, the PDU set 3 is discarded. This continues until an I-frame is encountered, and then discarding stops.

For example, if the PDU set 1 is an important PDU set, and some PDUs in the PDU set 1 are not successfully transmitted but are invalid, the PDU set 1 may be discarded. If the PDU set 2 is an unimportant PDU set frame, the PDU set 2 may also be discarded. If the PDU set 3 is an important PDU set, the PDU set 3 is not discarded. If the PDU set 3 is an unimportant PDU set, the PDU set 3 is discarded. This continues until an important PDU set is encountered, and then discarding stops.

It should be understood that Embodiment 3 may be combined with Embodiment 1 or Embodiment 2.

In some embodiments, the method may further include: adjusting a priority of a protocol entity corresponding to the $(w+e+1)^{th}$ PDU set. Further, priorities of other $m-1$ protocol entities in the m protocol entities may be adjusted.

For example, when $[j+(a-b)+m] \bmod m+0$, an adjusted priority of the $j^{th}$ protocol entity in the m protocol entities is an unadjusted priority of the $([j+(a-b)+m] \bmod m)^{th}$ protocol entity in the m protocol entities. When $[j+(a-b)+m] \bmod m=0$, an adjusted priority of the $j^{th}$ protocol entity in the m protocol entities is an unadjusted priority of the $m^{th}$ protocol entity in the m protocol entities. The $a^{th}$ protocol entity in the m protocol entities is used to carry the $(w+e+1)^{th}$ PDU set, and before the adjustment, the $b^{th}$ protocol entity in the m protocol entities is a protocol entity with a highest priority in the m protocol entities, where $1 \leq a \leq m$, and $1 \leq b \leq m$.

Based on this solution, it can be ensured that the $1^{st}$ PDU set that does not need to be discarded is first sent. This can ensure that the PDU sets are sent in sequence.

In the solution described above, PDU sets of different types, for example, a P frame and an I frame, may be delivered to a same protocol entity. In some other embodiments of this application, only frames of a same type can be delivered to a same protocol entity. The k consecutive PDU sets may be delivered to a corresponding protocol entity based on a type of each PDU set.

In some embodiments, quantities of protocol entities corresponding to the first-type PDU sets and the second-type PDU sets are both m. For a value of m, refer to the foregoing descriptions.

The k PDU sets are classified based on the first type and the second type, and include the $1^{st}$ to the kith first-type PDU sets and the $1^{st}$ to the $k2^{th}$ second-type PDU sets, where k1+k2=k. The $1^{st}$ to the kith first-type PDU sets are sequentially delivered, according to the delivery sequence or rule described above, to the m protocol entities corresponding to the first-type PDU sets, and the $1^{st}$ to the kith second-type PDU sets are sequentially delivered, according to the delivery sequence or rule described above, to the m protocol entities corresponding to the second-type PDU sets.

For example, if the PDU set 1 and the PDU set 2 are of the first type, the PDU set 1 and the PDU set 2 are the $1^{st}$ and the $2^{nd}$ first-type PDU sets. If the PDU set 3 is of the second type, the PDU set 3 is the $1^{st}$ second-type PDU set. If the PDU set 4 is of the first type, the PDU set 3 is the $3^{rd}$ first-type PDU set. It is assumed that the m protocol entities corresponding to the first-type PDU sets are a protocol entity 1, a protocol entity 2, and a protocol entity 3, and the m protocol entities corresponding to the second-type PDU sets are a protocol entity 4, a protocol entity 5, and a protocol entity 6. In this case, the PDU set 1 may be delivered to the protocol entity 1, the PDU set 2 may be delivered to the protocol entity 2, the PDU set 3 may be delivered to the protocol entity 4, and the PDU set 4 may be delivered to the protocol entity 3. If there is still a first-type PDU set 5, the first-type PDU set 5 may be delivered to the PDU set 1. Other PDU set delivery rules are similar, and details are not described herein again.

The foregoing describes the method embodiments provided in this application, and the following describes apparatus embodiments provided in this application. It should be understood that descriptions of apparatus embodiments correspond to the descriptions of the method embodiments. Therefore, for content that is not described in detail, refer to the method embodiments. For brevity, details are not described herein again.

Figure 11:
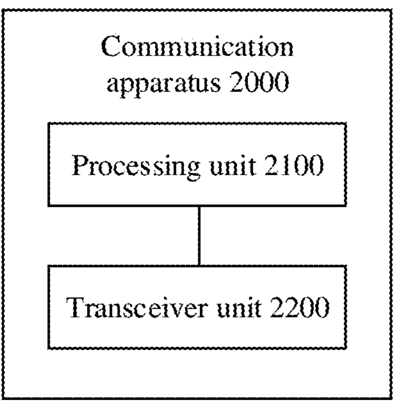
FIG. 11 is a block diagram of an example of a communication apparatus according to an embodiment of this application.

FIG. 11 is a block diagram of a communication apparatus according to an embodiment of this application. As shown in FIG. 11, the apparatus 2000 may include a processing unit 2100 and a transceiver unit 2200. The transceiver unit 2200 may implement a corresponding communication function, for example, receive or send a PDU set. The processing unit 2100 may implement a corresponding processing function, for example, deliver a PDU set to a protocol entity. The transceiver unit 2200 may also be referred to as a communication interface or a communication unit. Optionally, the apparatus 2000 may further include a storage unit. The storage unit may be configured to store instructions and/or data. The processing unit 2100 may read the instructions and/or the data in the storage unit, so that the apparatus implements the foregoing method embodiments.

In a possible design, the apparatus 2000 may be the transmitting end in the foregoing method embodiments, or may be a module or a chip used in the transmitting end. The apparatus 2000 may be configured to perform steps or procedures performed by the transmitting end in any one of the foregoing method embodiments.

Specifically, the processing unit 2100 is configured to sequentially deliver k consecutive protocol data unit sets PDU sets to m protocol entities in a first sequence. When k>m, k−m consecutive PDU sets starting from the $(m+1)^{th}$ PDU set in the k PDU sets are sequentially delivered to the m protocol entities in the first sequence, priorities of the m protocol entities are different from each other, and m>1. The transceiver unit 2200 is configured to sequentially send the k PDU sets.

Optionally, the first sequence is an arrangement sequence of the m protocol entities, or the m protocol entities are arranged in the first sequence.

Optionally, the processing unit 2100 is specifically configured to: deliver the $q^{th}$ PDU set in the k PDU sets to the $v^{th}$ protocol entity in the m protocol entities. If q mod m+0, v=q mod m, or if q mod m=0, v=m; and mod represents a modulo operation.

Optionally, the transceiver unit 2200 is specifically configured to sequentially send the k PDU sets by using a transmission resource. The processing unit 2100 is further configured to adjust the priorities of the m protocol entities if a current transmission resource is exhausted or less than a first preset value.

Optionally, the processing unit 2100 is specifically configured to: if the current transmission resource is insufficient to send the $s^{th}$ PDU set in the k PDU sets completely, adjust a priority of a protocol entity corresponding to the $s^{th}$ PDU set to highest; or if the current transmission resource is used to send the $s^{th}$ PDU set completely but is insufficient to send the $(s+1)^{th}$ PDU set, adjust a priority of a protocol entity corresponding to the $(s+1)^{th}$ PDU set to highest.

Optionally, the transceiver unit 2200 is specifically configured to: adjust the priorities of the m protocol entities after each PDU set is sent completely. The unadjusted priorities of the m protocol entities are sequentially m1, m2, . . . , and mm, and adjusted priorities of the m protocol entities are sequentially mm, m1, . . . , and m (m−1).

Optionally, the processing unit 2100 is further configured to: when the $w^{th}$ PDU set in the k PDU sets is invalid, discard a PDU that is not successfully transmitted in the $w^{th}$ PDU set, where w≥1.

Optionally, the processing unit 2100 is further configured to discard at least one PDU set. The at least one PDU set is the $(w+1)^{th}$ PDU set to the $(w+e)^{th}$ PDU set, e≥1, the at least one PDU set is of a first type and is associated with the $w^{th}$ PDU set, both the $w^{th}$ PDU set and the $(w+e+1)^{th}$ PDU set are of a second type, and the first type is different from the second type.

Optionally, the protocol entity is any one of the following: a packet data convergence protocol PDCP entity, a radio link control RLC entity, a service data adaptation protocol SDAP entity, or a medium access control MAC entity.

Optionally, m>x, and x is determined based on one or more of the following: a periodicity of the PDU set, validity duration of the PDU set, or maximum duration of the PDU set.

In another possible design, the apparatus 2000 may be the receiving end in the foregoing method embodiments, or may be a module or a chip used in the receiving end. The apparatus 2000 may be configured to perform steps or procedures performed by the receiving end in any one of the foregoing method embodiments.

Specifically, the transceiver unit 2200 is configured to sequentially receive k consecutive protocol data unit sets PDU set. The processing unit 2100 is configured to sequentially deliver the k PDU sets to m protocol entities in a first sequence. When k>m, k−m consecutive PDU sets starting from the $(m+1)^{th}$ PDU set in the k PDU sets are sequentially delivered to the m protocol entities in the first sequence, priorities of the m protocol entities are different from each other, and m>1.

Optionally, the first sequence is an arrangement sequence of the m protocol entities, or the m protocol entities are arranged in the first sequence.

Optionally, the processing unit 2100 is specifically configured to: deliver the $q^{th}$ PDU set in the k PDU sets to the $v^{th}$ protocol entity in the m protocol entities. If q mod m+0, v=q mod m, or if q mod m=0, v=m; and mod represents a modulo operation.

Optionally, the protocol entity is any one of the following: a packet data convergence protocol PDCP entity, a radio link control RLC entity, a service data adaptation protocol SDAP entity, or a medium access control MAC entity.

Optionally, max, and x is determined based on one or more of the following: a periodicity of the PDU set, validity duration of the PDU set, or maximum duration of the PDU set.

It should be understood that the "unit" in the apparatus 2000 may be implemented by hardware, or may be implemented by software, or may be implemented by hardware executing corresponding software. For example, the "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. For another example, the transceiver unit 2200 may be replaced with a transceiver circuit (for example, may include a receiving circuit and a sending circuit), and the processing unit 2100 may be replaced with a processor or a processing circuit.

Figure 12:
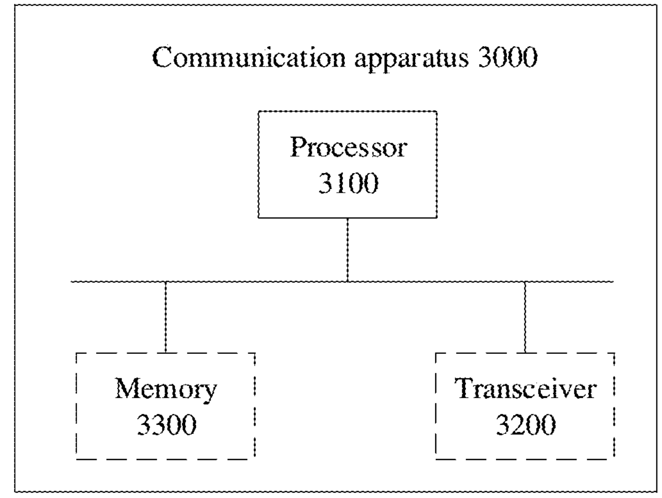
FIG. 12 is a block diagram of another example of a communication apparatus according to an embodiment of this application.

FIG. 12 is a block diagram of another communication apparatus 3000 according to an embodiment of this application. The apparatus 3000 may be a transmitting end, or may be a receiving end, or may be a chip, a chip system, a processor, or the like that supports the transmitting end in implementing the foregoing method, or may be a chip, a chip system, a processor, or the like that supports the receiving end in implementing the foregoing method. The apparatus may be configured to implement the methods described in the foregoing method embodiments. For details, refer to the descriptions in the foregoing method embodiments.

The apparatus 3000 may include one or more processors 3100. The processor 3100 may also be referred to as a processing unit, and may implement a specific control function. The processor 3100 may be a general-purpose processor, a dedicated processor, or the like, for example, a baseband processor or a central processing unit. The baseband processor may be configured to process a communication protocol and communication data. The central processing unit may be configured to control the communication apparatus (for example, a base station, a baseband chip, a user chip, a DU, or a CU), execute a software program, and process data of the software program.

In an optional design, the processor 3100 may also store instructions and/or data, and the instructions and/or the data 28 may be run by the processor 3100, so that the apparatus 3000 performs the method described in the foregoing method embodiments.

In another optional design, the processor 3100 may include a transceiver 3200 configured to implement receiving and sending functions. For example, the transceiver 3200 may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, the apparatus 3000 may include a circuit. The circuit may implement a sending, receiving, or communication function in the foregoing method embodiments.

Optionally, the apparatus 3000 may include one or more memories 3300. The memory 3300 may store instructions. The instructions may be run on the processor 3100, so that the apparatus 3000 performs the method described in the foregoing method embodiments. Optionally, the memory 3300 may further store data. Optionally, the processor 3100 may also store instructions and/or data. The processor 3100 and the memory may be separately arranged, or may be integrated together.

Figure 13:
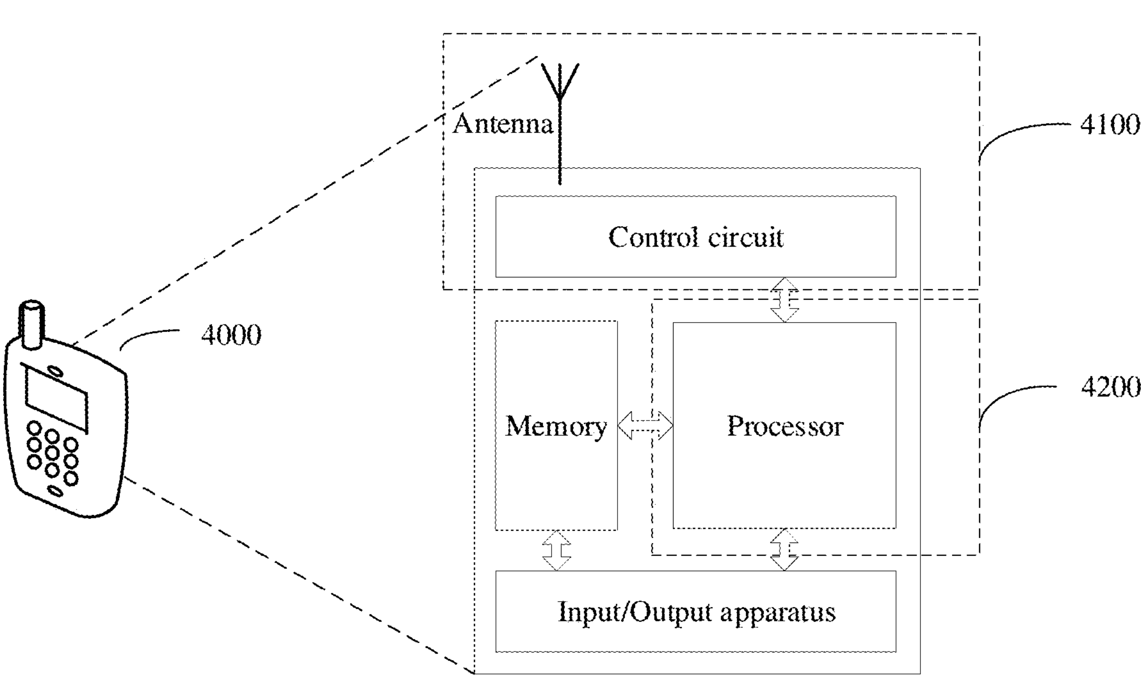
FIG. 13 is a diagram of a structure of an example of a terminal device according to an embodiment of this application.

FIG. 13 is a diagram of a structure of a terminal device 4000 according to this application. The communication apparatus 2000 or the communication apparatus 3000 may be configured in the terminal device 4000. Alternatively, the communication apparatus 2000 or the communication apparatus 3000 may be the terminal device 4000. In other words, the terminal device 4000 may perform an action performed by the transmitting end or the receiving end in the foregoing method embodiments. Optionally, for ease of description, FIG. 13 shows only main components of the terminal device. As shown in FIG. 13, the terminal device 4000 includes a processor, a memory, a control circuit, an antenna, and an input/output apparatus.

The processor is mainly configured to: process a communication protocol and communication data; control an entire terminal device; execute a software program; and process data of the software program. For example, the processor is configured to support the terminal device in performing an action described in the embodiment of the foregoing data transmission method. The memory is mainly configured to store the software program and the data, for example, store the PDU set described in the foregoing embodiments. The control circuit is mainly configured to perform conversion between a baseband signal and a radio frequency signal, and process the radio frequency signal. A combination of the control circuit and the antenna may also be referred to as a transceiver, mainly configured to send/receive a radio frequency signal in an electromagnetic wave form. The input/output apparatus, such as a touchscreen, a display, or a keyboard, is mainly configured to: receive data input by a user and output data to the user.

After the terminal device is powered on, the processor may read the software program in a storage unit, interpret and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that, for ease of description, FIG. 13 shows only one memory and one processor. In an actual terminal device, there may be a plurality of processors and a plurality of memories. The memory may also be referred to as a storage medium, a storage device, or the like. This is not limited in embodiments of this application.

For example, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 13 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in a storage unit in a form of the software program. The processor executes the software program to implement a baseband processing function.

For example, in this embodiment of this application, the antenna and the control circuit that have receiving and sending functions may be considered as a transceiver unit 4100 of the terminal device 4000, and the processor that has a processing function may be considered as a processing unit 4200 of the terminal device 4000. As shown in FIG. 13, the terminal device 4000 includes the transceiver unit 4100 and the processing unit 4200. The transceiver unit may also be referred to as a transceiver, a transceiver machine, a transceiver apparatus, or the like. Optionally, a component configured to implement a receiving function in the transceiver unit 4100 may be considered as a receiving unit, and a component configured to implement a sending function in the transceiver unit 4100 may be considered as a sending unit. That is, the transceiver unit 4100 includes the receiving unit and the sending unit. For example, the receiving unit may also be referred to as a receiver, a receiver machine, a receiver circuit, or the like, and the sending unit may be referred to as a transmitter, a transmitter machine, a transmitter circuit, or the like.

Figure 14:
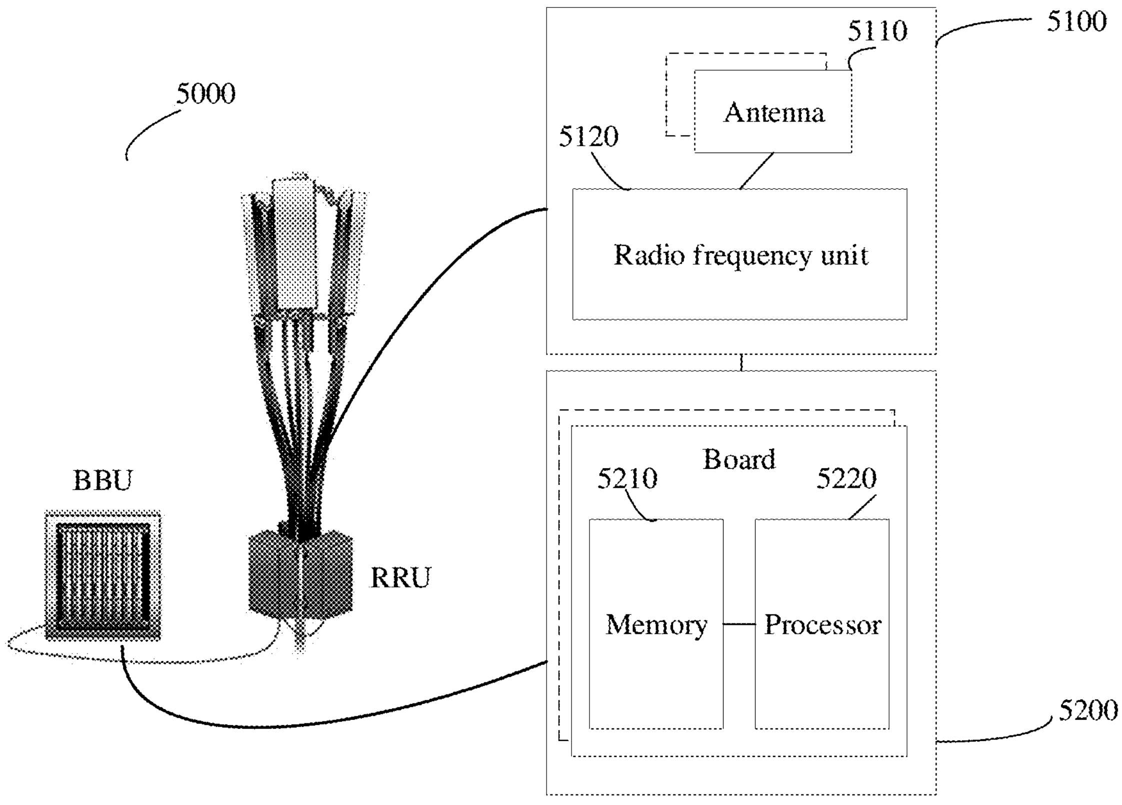
FIG. 14 is a diagram of a structure of an example of a network device according to an embodiment of this application.

FIG. 14 is a diagram of a structure of a network device 5000 according to an embodiment of this application. The communication apparatus 2000 or the communication apparatus 3000 may be configured in the network device 5000. Alternatively, the communication apparatus 2000 or the communication apparatus 3000 may be the network device 5000. In other words, the network device 5000 may perform an action performed by the transmitting end or the receiving end in the foregoing method embodiments.

The network device 5000 may include one or more radio frequency units, such as a remote radio frequency unit (RRU) 5100 and one or more baseband units (BBU) 5200 (which may also be referred to as digital units (DU)). The RRU 5100 may be referred to as a transceiver unit, a transceiver machine, a transceiver circuit, a transceiver, or the like, and may include at least one antenna 5110 and a radio frequency unit 5120. The RRU 5100 is mainly configured to: receive and send radio frequency signals, and perform conversion between a radio frequency signal and a baseband signal. The BBU 5200 is mainly configured to perform baseband processing, control the network device 5000, and the like. The RRU 5100 and the BBU 5200 may be physically disposed together, or may be physically disposed separately, that is, in a distributed base station.

The BBU 5200 is a control center of the network device 5000, may also be referred to as a processing unit, and is mainly configured to perform baseband processing functions such as channel coding, multiplexing, modulation, and spectrum spreading. For example, the BBU (the processing unit) 5200 may be configured to control the network device 5000 to perform an operation procedure related to the transmitting end or the receiving end in the foregoing method embodiments.

In an example, the BBU 5200 may include one or more boards. A plurality of boards may jointly support a radio access network (for example, an LTE system or a 5G system) of a single access standard, or may separately support radio access networks of different access standards. The BBU 5200 further includes a memory 5210 and a processor 5220. The memory 5210 is configured to store necessary instructions and data. The processor 5220 is configured to control the network device 5000 to perform a necessary action, for example, configured to control the network device 5000 to perform an operation procedure related to the transmitting end or the receiving end in the foregoing method embodiments. The memory 5210 and the processor 5220 may serve one or more boards. In other words, a memory and a processor may be deployed on each board. Alternatively, a plurality of boards may share a same memory and a same processor. In addition, a necessary circuit may be further disposed on each board.

In a possible implementation, with development of a system-on-chip (SoC) technology, all or a part of functions of the parts 5200 and 5100 may be implemented by using the SoC technology, for example, implemented by using one base station function chip. The base station function chip integrates components such as a processor, a memory, and an antenna port. A program of a base station-related function is stored in the memory, and the processor executes the program to implement the base station-related function. Optionally, the base station function chip can also read an external memory of the chip, to implement the base station-related function.

It should be understood that the structure of the network device shown in FIG. 14 is merely a possible form, and should not constitute any limitation on the embodiments of this application. In this application, a possibility that there may be a base station structure in another form in the future is not excluded.

It should be understood that, in a possible design, the steps in the method embodiments provided in this application may be implemented by using a hardware integrated logic circuit in the processor or by using instructions in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the method disclosed with reference to embodiments of this application may be directly performed by a hardware decoding processor, or may be performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these and any memory of another proper type.

This application further provides a computer program product. The computer program product includes computer program code. When the computer program code is run on a computer, the computer is enabled to perform the steps or procedures performed by the transmitting end or the receiving end in any one of the foregoing method embodiments.

This application further provides a computer-readable storage medium. The computer-readable storage medium stores program code. When the program code is run on a computer, the computer is enabled to perform the steps or procedures performed by the transmitting end or the receiving end in any one of the foregoing method embodiments.

This application further provides a communication system, including a transmitting end and a receiving end.

The foregoing apparatus embodiments completely correspond to the foregoing method embodiments. A corresponding module or unit performs a corresponding step. For example, a transceiver unit or a transceiver performs a receiving step or a sending step in the method embodiments, and a processing unit or a processor may perform a step other than the sending step or the receiving step.

In embodiments of this application, the terms and English abbreviations are all examples given for ease of description, and should not constitute any limitation on this application. This application does not exclude a possibility of defining another term that can implement a same or similar function in an existing or a future protocol.

Terms such as "component", "module", and "system" used in this specification indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed from a variety of computer-readable storage media having various data structures stored thereon. For example, the components may communicate by using a local and/or remote process and based on a signal having one or more data packets (for example, data from two components interacting with another component in a local system, a distributed system, and/or across a network such as the internet interacting with another system by using the signal).

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatuses, and units, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logic function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In the foregoing embodiments, all or some of the functions of the functional units may be implemented by software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

sequentially delivering k consecutive protocol data unit (PDU) sets to m protocol entities in a first sequence, wherein when k>m, k−m consecutive PDU sets starting from a (m+1)th PDU set in the k PDU sets are sequentially delivered to the m protocol entities in the first sequence, wherein priorities of the m protocol entities are different from each other, and m>1; and sequentially sending the k PDU sets.

2. The method according to claim 1, wherein the first sequence is an arrangement sequence of the m protocol entities, or the m protocol entities are arranged in the first sequence.

3. The method according to claim 1, wherein sequentially delivering the k consecutive PDU sets to the m protocol entities in the first sequence comprises:

delivering a $q^{th}$ PDU set in the k PDU sets to an s $v^{th}$ protocol entity in the m protocol entities, wherein when q mod m≠0, v=q mod m, or when q mod m=0, v=m, and wherein mod represents a modulo operation.

4. The method according to claim 1, wherein sequentially sending the k PDU sets comprises:

sequentially sending the k PDU sets by using a transmission resource; and adjusting the priorities of the m protocol entities when a current transmission resource is exhausted or less than a first preset value.

5. The method according to claim 4, wherein adjusting the priorities of the m protocol entities when the current transmission resource is exhausted or less than the first preset value comprises:

when the current transmission resource is insufficient to send an $s^{th}$ PDU set in the k PDU sets completely, adjusting a priority of a protocol entity corresponding to the $s^{th}$ PDU set to highest priority; or when the current transmission resource is used to send the $s^{th}$ PDU set completely but is insufficient to send an $(s+1)^{th}$ PDU set, adjusting a priority of a protocol entity corresponding to the $(s+1)^{th}$ PDU set to highest priority.

6. The method according to claim 1, wherein sequentially sending the k PDU sets comprises:

adjusting the priorities of the m protocol entities after each PDU set is sent completely, wherein unadjusted priorities of the m protocol entities are sequentially m1, m2, . . . , and mm, and adjusted priorities of the m protocol entities are sequentially mm, m1, . . . , and m(m−1).

7. The method according to claim 1, further comprising:

when a $w^{th}$ PDU set in the k PDU sets is invalid, discarding a PDU that is not successfully transmitted in the $w^{th}$ PDU set, wherein w≥1.

8. A method, comprising:

sequentially receiving k consecutive protocol data unit (PDU) sets; and sequentially delivering the k PDU sets to m protocol entities in a first sequence, wherein when k>m, k−m consecutive PDU sets starting from a $(m+1)^{th}$ PDU set in the k PDU sets are sequentially delivered to the m protocol entities in the first sequence, wherein priorities of the m protocol entities are different from each other, and m>1.

9. The method according to claim 8, wherein the first sequence is an arrangement sequence of the m protocol entities, or the m protocol entities are arranged in the first sequence.

10. The method according to claim 8, wherein sequentially delivering the k PDU sets to the m protocol entities in the first sequence comprises:

delivering a $q^{th}$ PDU set in the k PDU sets to a $v^{th}$ protocol entity in the m protocol entities, wherein when q mod m≠0, v=q mod m, or when q mod m=0, v=m, and wherein mod represents a modulo operation.

11. The method according to claim 8, wherein each protocol entity is any one of the following: a packet data convergence protocol (PDCP) entity, a radio link control (RLC) entity, a service data adaptation protocol (SDAP) entity, or a medium access control (MAC) entity.

12. The method according to claim 11, wherein m≥x, and x is determined based on one or more of the following: a periodicity of a respective PDU set, validity duration of a respective PDU set, or maximum duration of a respective PDU set.

13. An apparatus, comprising:

at least one processor, configured to sequentially deliver k consecutive protocol data unit (PDU) sets to m protocol entities in a first sequence, wherein when k>m, k−m consecutive PDU sets starting from a $(m+1)^{th}$ PDU set in the k PDU sets are sequentially delivered to the m protocol entities in the first sequence, wherein priorities of the m protocol entities are different from each other, and m>1; and a transceiver, configured to sequentially send the k PDU sets.

14. The apparatus according to claim 13, wherein the first sequence is an arrangement sequence of the m protocol entities, or the m protocol entities are arranged in the first sequence.

15. The apparatus according to claim 13, wherein the at least one processor is configured to:

deliver a $q^{th}$ PDU set in the k PDU sets to a $v^{th}$ protocol entity in the m protocol entities, wherein when q mod m≠0, v=q mod m, or when q mod m=0, v=m, and wherein mod represents a modulo operation.

16. The apparatus according to claim 13, wherein the transceiver is configured to sequentially send the k PDU sets by using a transmission resource; and the at least one processor is further configured to adjust the priorities of the m protocol entities when a current transmission resource is exhausted or less than a first preset value.

17. The apparatus according to claim 16, wherein the at least one processor is configured to:

when the current transmission resource is insufficient to send a $s^{th}$ PDU set in the k PDU sets completely, adjust a priority of a protocol entity corresponding to the $s^{th}$ PDU set to highest priority; or when the current transmission resource is used to send the $s^{th}$ PDU set completely but is insufficient to send a $(s+1)^{th}$ PDU set, adjust a priority of a protocol entity corresponding to the $(s+1)^{th}$ PDU set to highest priority.

18. The apparatus according to claim 13, wherein the transceiver is configured to:

adjust the priorities of the m protocol entities after each PDU set is sent completely, wherein unadjusted priorities of the m protocol entities are sequentially m1, m2, . . . , and mm, and adjusted priorities of the m protocol entities are sequentially mm, m1, . . . , and m(m−1).

19. The apparatus according to claim 13, wherein the at least one processor is further configured to:

when a $w^{th}$ PDU set in the k PDU sets is invalid, discard a PDU that is not successfully transmitted in the $w^{th}$ PDU set, wherein w≥1.

20. The apparatus according to claim 19, wherein the at least one processor is further configured to:

discard at least one PDU set, wherein the at least one PDU set is a $(w+1)^{th}$ PDU set to a $(w+e)^{th}$ PDU set, e≥1, the at least one PDU set is of a first type and is associated with the $w^{th}$ PDU set, both the $w^{th}$ PDU set and a $(w+e+1)^{th}$ PDU set are of a second type, and the first type is different from the second type.

* * * * *